United States Patent [19]

Spies

[11] Patent Number: 4,900,565
[45] Date of Patent: Feb. 13, 1990

[54] WATER-SOLUBLE EXTRACT WITH BREAD-LIKE FLAVOR

[75] Inventor: Gerhard Spies, Ludwigsburg, Fed. Rep. of Germany

[73] Assignee: Nestec S.A., Vevey, Switzerland

[21] Appl. No.: 99,089

[22] Filed: Sep. 21, 1987

[30] Foreign Application Priority Data

Oct. 7, 1986 [CH] Switzerland ............... 4003/86

[51] Int. Cl.$^4$ ............................................. A23L 2/26
[52] U.S. Cl. ................................... 426/28; 426/492; 426/533; 426/655
[58] Field of Search ............... 426/28, 533, 655, 492

[56] References Cited

U.S. PATENT DOCUMENTS

| | | | |
|---|---|---|---|
| 3,304,184 | 2/1967 | Wiseblatt | 426/533 |
| 3,425,840 | 2/1969 | Hunter et al. | 426/533 |
| 3,499,765 | 3/1970 | Lendvay | 426/533 |
| 3,547,659 | 12/1970 | Cort | 426/533 |
| 4,663,168 | 5/1987 | Fulger et al. | 426/20 |
| 4,752,482 | 6/1988 | Fulger et al. | 426/533 |

OTHER PUBLICATIONS

Furia et al. Fenaralis Handbook of Flavor Ingredients CRC Puss Inc. (1975) pp. 132–133 and 665.

*Primary Examiner*—R. B. Penland
*Attorney, Agent, or Firm*—Vogt & O'Donnell

[57] ABSTRACT

An extract having a bread-like flavor is prepared by baking bread, size reducing the baked bread, mixing water with the size reduced bread for preparing a mash, treating the mash with at least one enzyme capable of liquifying bread for liquifying the bread of the mash, subjecting the aqueous liquified bread to slurry extraction, and then the aqueous slurry extracted liquified bread is subjected to steam distillation. A combined residue and extract and a distillate result from the steam distillation. The residue and extract are separated for obtaining a clarified extract which is then concentrated by evaporation. The distillate is mixed with the concentrated extract, and the mixture is dried. A water-soluble light colored powder with a bread-like flavor is obtained. To improve the yield, the separated residue also may be mixed with water and processed by slurry extraction and each of the subsequent steps of the process for obtaining further product.

14 Claims, 1 Drawing Sheet

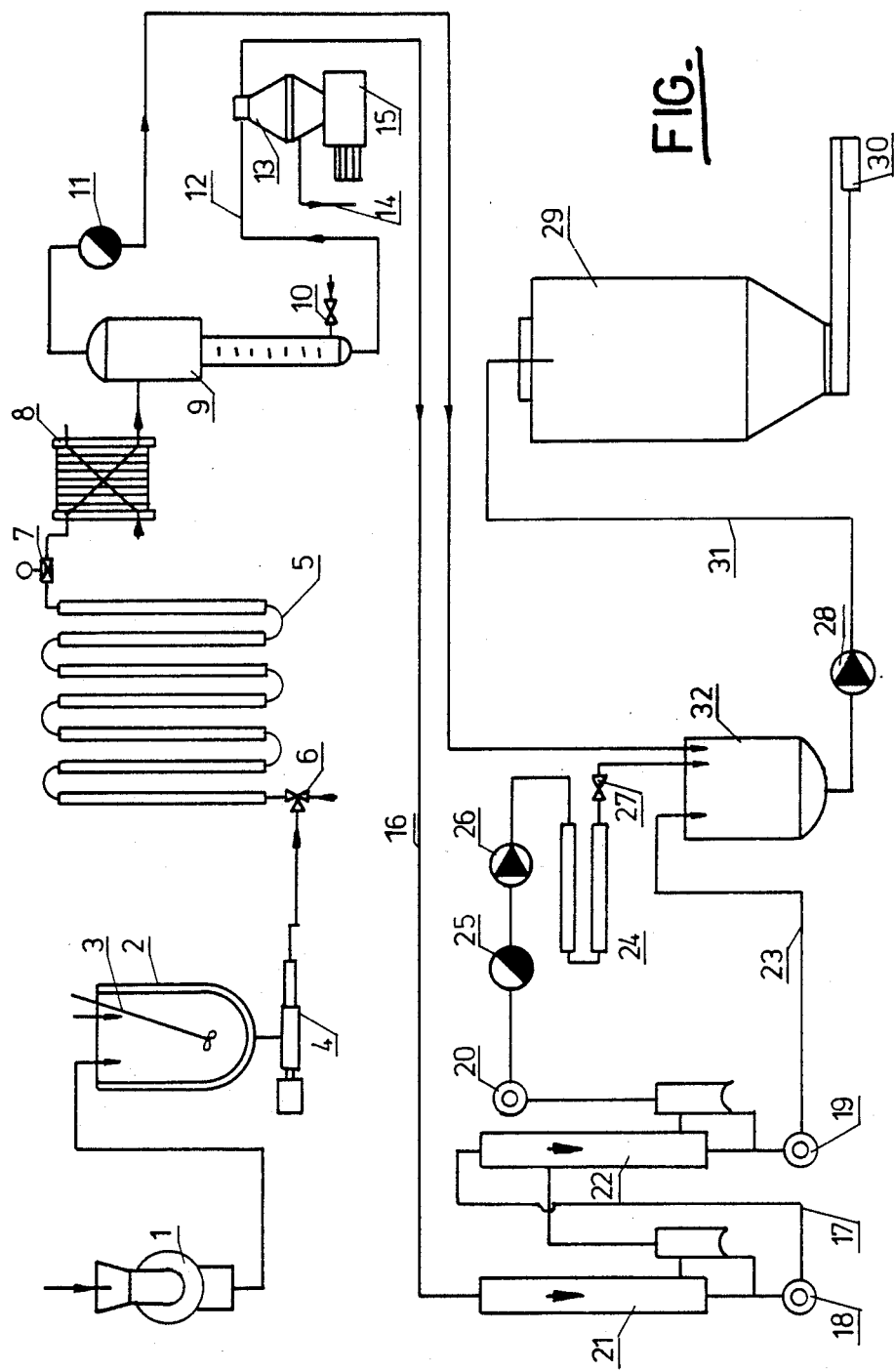
FIG.

WATER-SOLUBLE EXTRACT WITH BREAD-LIKE FLAVOR

BACKGROUND OF THE INVENTION

This invention relates to a water-soluble extract which has a bread-like flavour, to a process for the preparation of this extract and to an apparatus for carrying out the process.

Products based on bread flavour are becoming increasingly important. It would therefore be of interest to be able to produce an extract with a powerful flavour of bread, which could be used either as such or as an additive. Nothing of this kind has so far been available.

SUMMARY OF THE INVENTION

It is an object of the present invention to be able to produce an extract which is manufactured from bread as starting material.

The present invention relates to a water-soluble extract which has a bread-like flavour and contains the water-soluble flavouring substances which determine the flavour of bread. The extract has the appearance of a light coloured powder. It may be used as such or as a basis for milk modifiers and aqueous infusions or brews or as additives to baby food. It has a dry substance content of from 90 to 98%, a starch content of from 50 to 60% and a reducing sugar content of from 20 to 50%, based on the dry substance. The high sugar content of the extract is due to the special treatment carried out for the preparation of the extract.

The invention further relates to the process for the preparation of this extract, in which process bread is baked, sized reduced and liquefied in water with at least one enzyme and the resulting bread mash is subjected to a slurry extraction followed by steam distillation to collect the distillate which contains readily volatile flavouring substances. The undissolved substances are then separated and the clarified extract is concentrated by evaporation and finally the distillate is dried together with the concentrated extract.

DETAILED DESCRIPTION OF THE INVENTION

The bread is produced by the conventional process from water, flour, salt, yeast and possibly the addition of spices or flavourings for bread. In order to obtain a very dry product with a strong flavour, it is necessary to form the bread into flat cakes. The cakes are then baked at temperatures of from 220° to 250° C. and towards the end of the process the temperature is reduced to 150°–200° C.

The baked bread has a dry substance content of from 80 to 99%, a starch content of from 70 to 75% and a reducing sugar content of from 3.5 to 5.5%, based on the dry substance content.

The bread is then finely ground and made up into a mash with water, using a ratio by weight of bread to water of from 1:1 to 1:10. Ten times more water in the mash is the uppermost limit because too much water renders the process uneconomical and the yield then obtained is too low. The mash is kept at a temperature of about 35° to 80° C. and enzymes are then added. The purpose of these enzymes is to liquefy the bread. They break down the crust and crumb of the bread to a large extent so that the bread dissolves more readily in water and the mash obtained has a lower viscosity. Enzymes belonging to the group which breaks down starches, pentosan and glucan are suitable for this purpose. $\alpha$-Amylase and $\beta$-glucanase are preferably used. The quantity of enzymes added amounts to 0.05 to 1% by weight, based on the weight of dry substance. For the purpose of liquefying the bread, there is no advantage in adding more than 1%. The process of liquefaction is accompanied mainly by the breakdown of starch to dextrines and low molecular weight sugars. The enzymes are allowed to act for 10 to 30 minutes. A treatment continuing for more than 30 minutes has a deleterious effect on the flavour.

The liquefied bread has a dry substance content of from 13 to 17%, a starch content of from 45 to 50% and a reducing sugar content of from 25 to 30%, based on the dry substance.

In the process of slurry extraction which follows the enzyme treatment, the enzymes which have been added are inactivated. The second function of this slurry extraction is to trap the flavour by transferring the water-soluble aromatic and flavouring substances of bread to the aqueous phase. The liquefied bread mash is heated and pumped through a system of pipes. Heating is carried out by the injection of steam at the inlet into the slurry reactor. The extraction temperature is from 90° to 150° C. and the residence time in the reactor is from 15 to 30 minutes. These parameters are determined by the length of the reactor and the selected rate of throughput.

The above described treatment is followed by a steam distillation, the so-called stripping. In this process, the mash is distilled at about 95° to 98° C. in a distillation column in countercurrent to steam. The quantity of steam supplied is adjusted so that the quantity of distillate obtained amounts to about 25% by weight of the dry substance content of the extract to be distilled. This distillation is carried out to prevent loss of flavour and aroma during the subsequent process of concentration by evaporation.

After the stripping process, the undissolved solid constituents are separated from the extract in a separator. A clarified extract and the so-called separator residue are obtained. The clarified extract is thickened to about 45% TS (dry substance) in an evaporation plant (e.g., a falling film evaporator or a plate evaporator). This evaporation is preferably carried out in a vacuum at about 55° to 70° C. to prevent any damage to the product. Although it has been shown that the recovery of flavour is much more efficient if the unclarified extract is stripped, i.e., if the extract is first stripped and then separated, separation prior to stripping is still within the scope of the present invention.

It is also within the scope of this invention to subject the vapour condensate obtained from the process of evaporation to a reverse osmosis treatment in which the concentrate obtained is dried together with the distillate and the extract.

According to a preferred embodiment of the process, the separator residue is again mixed with water and the resulting mixture is then passed a second time through the process of flavour recovery described above, i.e., slurry extraction, steam distillation (stripping), separation, concentration by evaporation and reverse osmosis. This second stage of flavour recovery yields a fresh extract, distillate and concentrate. The extracts, distillates and concentrates of the two extraction stages may be mixed together, for example in the proportions in which they are obtained during the process, and dried in some suitable manner. A water-soluble, light coloured powder with a typical, bread-like flavour is obtained.

This second stage enables a higher yield and flavour of end product to be obtained. The yield of the first flavour recovering process is from 60 to 65% and that of the second process is from 40 to 45%. This amounts to a total yield of from 80 to 85% (all values based on the dry substance content of the bread put into the process).

The process may also be carried out without the slurry extraction. Such a variation is not preferred, however, as the flavour yield is then insufficient.

The present invention further relates to the apparatus for carrying out the process. It consists of the following parts connected by pipes:
A mash container for the enzyme treatment,
slurry reactor with means for heating and a device for maintaining the pressure,
a distillation column,
a separator
an evaporator,
a mixing means and
a drying means.

A means for size reducing the bread, e.g., a mill, is used for preparing the bread for the enzyme treatment. The mash container has a pump for delivering the mash to the slurry reactor.

The heating means in the slurry reactor is preferably a steam jet nozzle and the pressure maintaining device is preferably a valve.

According to one variation, the apparatus has a reverse osmosis column between the evaporator and the mixing means. The mixing means preferably consist of a mixing vessel and the drying means of a system for spray drying or freeze drying.

DESCRIPTION OF THE DRAWING

The apparatus according to this invention is described in more detail below with reference to a single FIGURE which is a schematic representation.

The bread is size reduced in the mill (1) and mixed with water in a mash vessel (2) equipped with a stirrer (3). After the enzyme treatment in this mash vessel, the mash is delivered into the slurry reactor (5) by the pump (4). The mash is heated on its entry into the slurry reactor by steam from a steam nozzle (6). The pressure maintaining device (7) ensures that the product will flow smoothly through the apparatus and maintains a certain pressure in the slurry reactor.

The means (8) for regulating the temperature of the mash ensures that the mash will enter the distillation column (9) at a temperature as close as possible to 95°–98° C. Steam is introduced in countercurrent from the steam nozzle (10). The distillate is condensed by the condenser (11) and flows directly into the mixing container (32). The aqueous phase flows through the pipe (12) into the separator (13) which is driven by the motor (15) and in which undissolved solid substances are separated from the extract. The separator residue (14) is again mixed with water and passes through the apparatus a second time.

The clarified extract flows through the pipe (16) into an installation (17) for evaporation. This installation comprises two columns (21,22) and the extract is conveyed by pumps (18,19) through the pipe (23) to enter the mixing vessel (32) where it is mixed with the distillate. The steam from the process of evaporation is delivered by the pump (20) to the reverse osmosis system (24) after having been condensed by the condenser (25) and passed through the pump (26). The concentrate obtained leaves through the valve (27) to be mixed with extract and distillate in the mixing vessel (32). The mixed component is carried along the pipe (31) by the pump (28) to enter the spray tower (29) where it is dried. The water-soluble extract according to the invention is obtained in the lower part (30) of the tower.

EXAMPLE

An example of practical application for the preparation of extract is described below, all percentages given in the description denoting percentages by weight.

A conventional mixed bread dough is prepared according to the following formulation:
42% water
26% rye flour Type 1150
26% wheat flour Type 1050
1.5% baker's yeast
1.5% salt
1% leavening agent
1% malt flour
1% spicing and flavouring mixture for bread.

The ingredients are mixed as in conventional processes of bread making and vigorously kneaded (about 10 minutes).

The dough is left to rest for about 45 minutes and kneaded and then shaped and again left to rest for 30 to 45 minutes. The resting times are used for development of the yeast which loosens the dough by the production of $CO_2$ and gives a structure to the crumb.

After the first resting period, the dough is shaped. It is preferably formed into thin, flat cakes about 0.5 cm in thickness so that a very dry product with a strong flavour may be obtained.

The conditions of the baking process are selected to give rise to a bread with a very thick crust. For this purpose, baking is started at a high temperature (about 220° to 250° C. for 25 to 30 minutes) and then finished at a lower temperature (from 150° to 200° C. for 30 to 40 minutes). 45 kg of the bread are then ground finely and mixed with 180 l of water at about 95° C. The resulting mash is tempered at 75° C. and 0.04% of $\alpha$-amylase and 0.1% of $\beta$-glucanase, based on the dry substance content of the bread, are added. The enzymes are left to act for 20 minutes. The mash is then heated to 110° C. with steam and pumped into a slurry reactor at the rate of 100 l per hour. This reactor comprises five pipes. 294 kg of mash having a dry substance content of 10.6% are passed through the steam distillation column at a flow rate of 80 l per hour at 97° to 99° C. The quantity of steam supplied is adjusted to result in 7.65 kg of distillate. The process of separation results in 52 kg of solid residue and a mash of 242 kg which is to be concentrated by evaporation. After this evaporation, a dry substance content of 45% is obtained, i.e., 57 kg of extract.

The residue of 52 kg is mixed with 150 kg of water. The mash is heated to 130° C. with steam and is passed through the slurry reactor at the rate of 100 l per hour. As in the first stage, the mash again enters the steam distillation column at about 97° to 99° C. on leaving the reactor. The quantity of steam supplied is adjusted to result in 1.13 kg of distillate. Separation results in 162 kg of an aqueous solution, which is then concentrated by evaporation to a dry substance content of 45%. The extracts and distillates from the two stages of flavour recovery are mixed together and spray dried. 34 kg of a light coloured powder are finally obtained.

This powder is readily soluble in water, contains water-soluble aromatic flavouring substances of bread and has an interesting application as basis for milk modifiers and aqueous infusions and as an addition to baby food and to all sorts of food products, especially cereal products such as bread, muesli and cereal flakes and porridge to impart a pronounced bread-like flavour to the products. The flavour may be varied by the addition of various substances such as spices and flavourings.

I claim:

1. A process for preparing a product having a bread-like flavor comprising:
   baking bread;
   size reducing the baked bread;
   mixing water with the size-reduced baked bread for preparing an aqueous mash;
   adding to the aqueous mash at least one enzyme selected from the group consisting of alpha-amylase and beta-glucanase and enzymatically treating the aqueous mash for up to 30 minutes, said at least one enzyme being present in an amount effective to liquefy the bread of the aqueous mash;
   subjecting the enzymatically-treated aqueous liquefied bread to slurry extraction for inactivating the enzymes and for transferring water-soluble aromatic and flavoring substances of the bread to the aqueous phase of the slurry-extracted liquefied bread;
   steam distilling the aqueous slurry-extracted liquefied bread to obtain a distillate and a steam-distilled extract containing undissolved solids residue;
   separating the steam-distilled extract from the residue;
   concentrating the separated steam-distilled extract by evaporation;
   mixing the distillate with the concentrated extract; and
   drying the mixture to obtain the product.

2. A process according to claim 1 wherein the at least one enzyme is added in an amount of from 0.05% to 1%.

3. A process according to claim 1 wherein the enzyme treatment is carried out for from 10 minutes to 30 minutes.

4. A process according to claim 1 wherein the baked bread has a dry substance content of from 80% to 99%, a starch content of from 70% to 75% based upon the dry substance content and a reducing sugar content of from 3.5% to 5.5% based upon the dry substance content.

5. A process according to claim 1 wherein the ratio by weight of the size reduced baked bread to water is from 1:1 to 1:10.

6. A process according to claim 1 or 4 wherein the slurry extraction is carried out at a temperature of from 90° C. to 150° C. for from 15 minutes to 30 minutes, wherein the aqueous slurry extracted liquefied bread is steam-distilled at from about 95° C. to 98° C. in a distillation column countercurrent to steam and wherein the quantity of steam used for steam distillation is adjusted for obtaining a quantity of distillate in an amount of about 25% of the amount of dry substance of the aqueous slurry extracted liquefied bread to be distilled.

7. A process according to claim 1 wherein the extract separated from the residue is concentrated under a vacuum at a temperature of about 55° C. to 70° C. for obtaining a dry substance content of about 45%.

8. A process according to claim 1 further comprising mixing the residue with water and subjecting the mixture to the slurry extraction, steam distillation, separation, concentration and drying steps for obtaining further extract and distillate for drying for obtaining the product.

9. A process according to claim 8 further comprising subjected vapor condensated obtained from each concentration step to a reverse osmosis treatment for obtaining a condensate and mixing the condensate with the extract and distillate mixture and drying the mixture for obtaining the product.

10. A process according to claim 1 further comprising subjecting vapor condensate obtained from the concentration of the extract to a reverse osmosis treatment for obtaining a condensate and mixing the condensate with the extract and distillate mixture and drying the mixture for obtaining the product.

11. A process according to claim 10 further comprising mixing the residue with water and subjecting the mixture to the slurry extraction, steam distillation, separation, concentration and reverse osmosis steps for obtaining further extract, distillate and condensate for drying for obtaining the product.

12. A process for preparing a product having a bread-like flavor comprising:
   baking bread;
   size reducing the baked bread;
   mixing water with the size-reduced baked bread for preparing an aqueous mash;
   adding to the aqueous mash at least one enzyme selected from the group consisting of alpha-amylose and beta-glucanase and enzymatically treating the aqueous mash for up to 30 minutes, said at least one enzyme being present in an amount effective to liquefy the bread of the aqueous mash;
   steam distilling the enzymatically-treated aqueous liquefied bread to obtain a distillate and a steam-distilled extract containing undissolved solids residue;
   separating the steam-distilled extract from the residue;
   concentrating the separated steam-distilled extract by evaporation;
   mixing the distillate with the concentrated extract; and
   drying the mixture to obtain the product.

13. A process for preparing a product having a bread-like flavor comprising:
   baking bread;
   size reducing the baked bread;
   mixing water with the size-reduced baked bread for preparing an aqueous mash;
   adding at least one enzyme selected from the group consisting of alpha-amylase and beta-glucanase and enzymatically treating the aqueous mash for up to 30 minutes, said at least one enzyme being present in an amount effective to liquefy the bread of the aqueous mash;
   subjecting the enzymatically-treated aqueous liquefied bread to slurry extraction for inactivating the enzymes and for transferring water soluble aromatic and flavoring substances of the bread to the aqueous phase of the slurry-extracted liquefied bread;
   separating undissolved solids from the aqueous phase of the slurry-extracted bread to obtain an extract;

steam distilling the separated extract for obtaining a distillate and a remaining steam-distilled extract;

concentrating the remaining steam-distilled extract by evaporation;

mixing the distillate with the concentrated extract; and drying the mixture to obtain the product.

14. A process for preparing a product having a bread-like flavor comprising:

mixing water with size-reduced baked bread for preparing an aqueous mash;

adding to the aqueous mash at least one enzyme selected from the group consisting of alpha-amylase and beta-glucanase and enzymatically treating the aqueous mash for up to 30 minutes, said at least one enzyme being present in an amount effective to liquefy the bread of the aqueous mash;

subjecting the enzymatically-treated aqueous liquefied bread to slurry extraction for inactivating the enzymes and for transferring water-soluble aromatic and flavoring substances of the bread to the aqueous phase of the slurry-extracted liquefied bread;

steam distilling the aqueous slurry-extracted liquefied bread to obtain a distillate and a steam distilled extract containing undissolved solids residue;

separating the steam-distilled extract from the residue;

concentrating the separated steam-distilled extract by evaporation;

mixing the distillate with the concentrated extract; and drying the mixture to obtain the product.

* * * * *

UNITED STATES PATENT AND TRADEMARK OFFICE
CERTIFICATE OF CORRECTION

PATENT NO. : 4,900,565

DATED : February 13, 1990

INVENTOR(S) : Gerhard SPIES

It is certified that error appears in the above-identified patent and that said Letters Patent is hereby corrected as shown below:

Column 6, line 10 (line 2 of claim 9), "subjected" should be --subjecting--.

Column 6, line 10 (line 2 of claim 9), "condensated" should be --condensate--.

Signed and Sealed this

First Day of January, 1991

Attest:

HARRY F. MANBECK, JR.

Attesting Officer

Commissioner of Patents and Trademarks